Aug. 11, 1942.                L. G. TERBRUEGGEN                2,292,588
                           AUTOMATIC INDEXING CONTROL
                             Filed July 14, 1941            6 Sheets-Sheet 1

INVENTOR.
LAWRENCE G. TERBRUEGGEN
BY Whittemore, Hulbert
   & Belknap ATTORNEYS

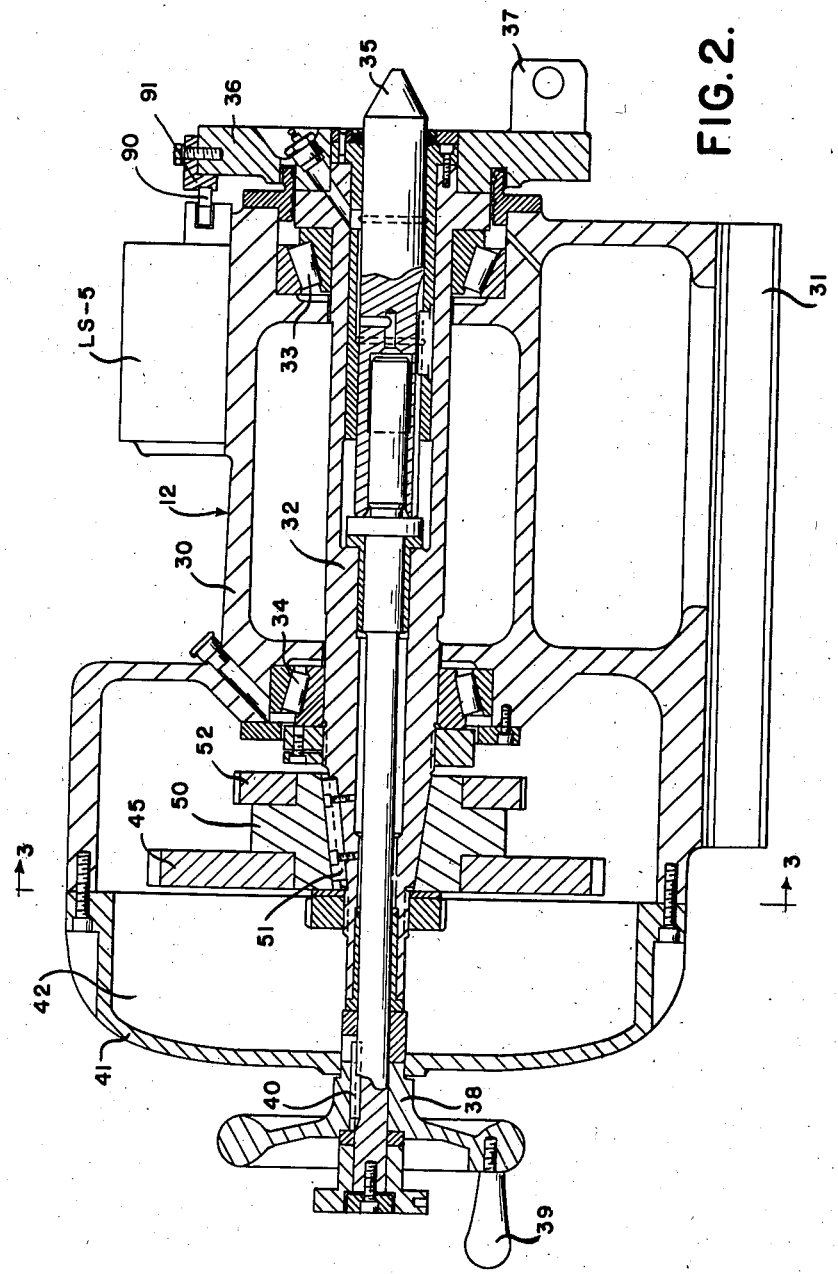

Aug. 11, 1942.  L. G. TERBRUEGGEN  2,292,588
AUTOMATIC INDEXING CONTROL
Filed July 14, 1941  6 Sheets-Sheet 3

INVENTOR.
LAWRENCE G. TERBRUEGGEN
BY
ATTORNEYS

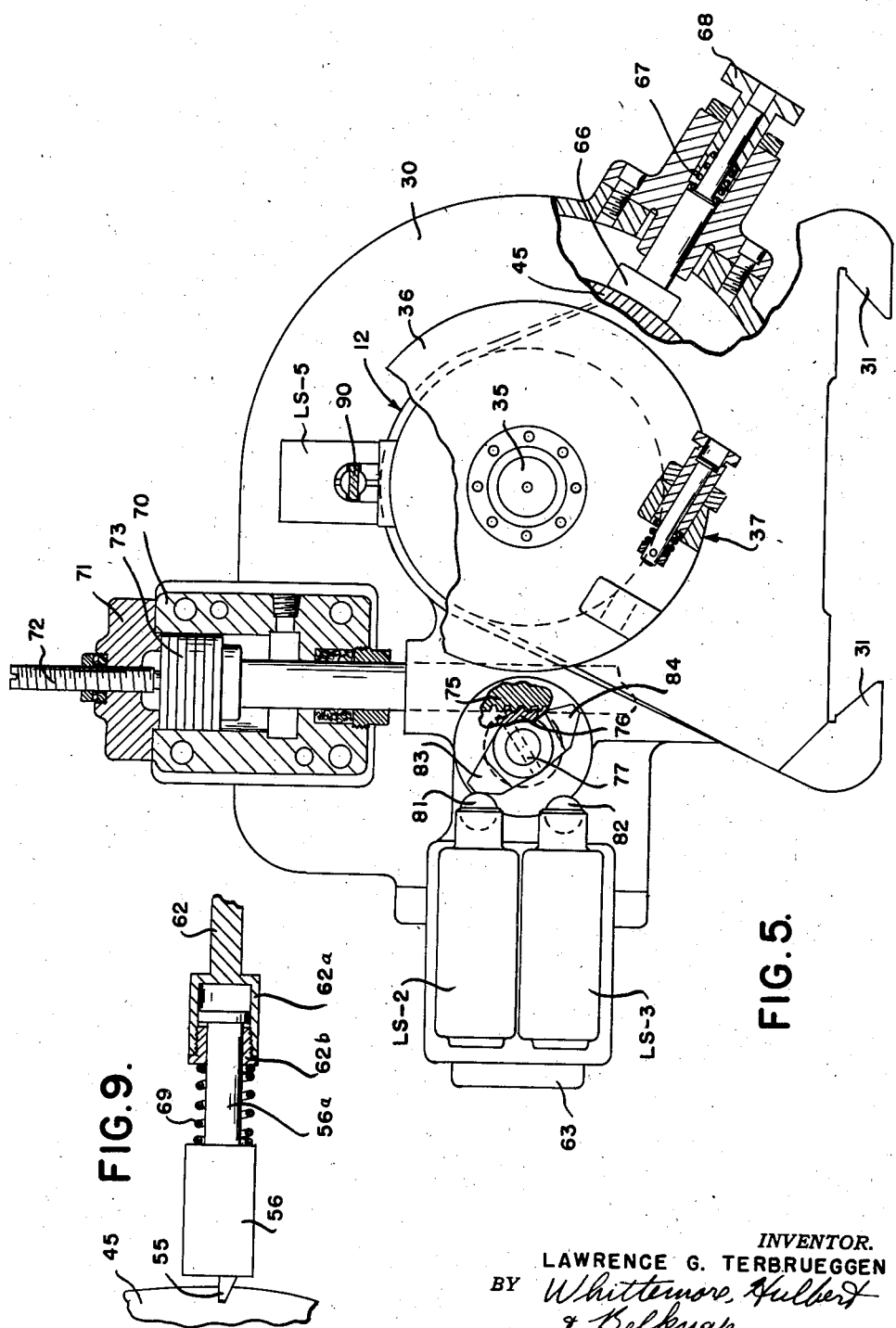

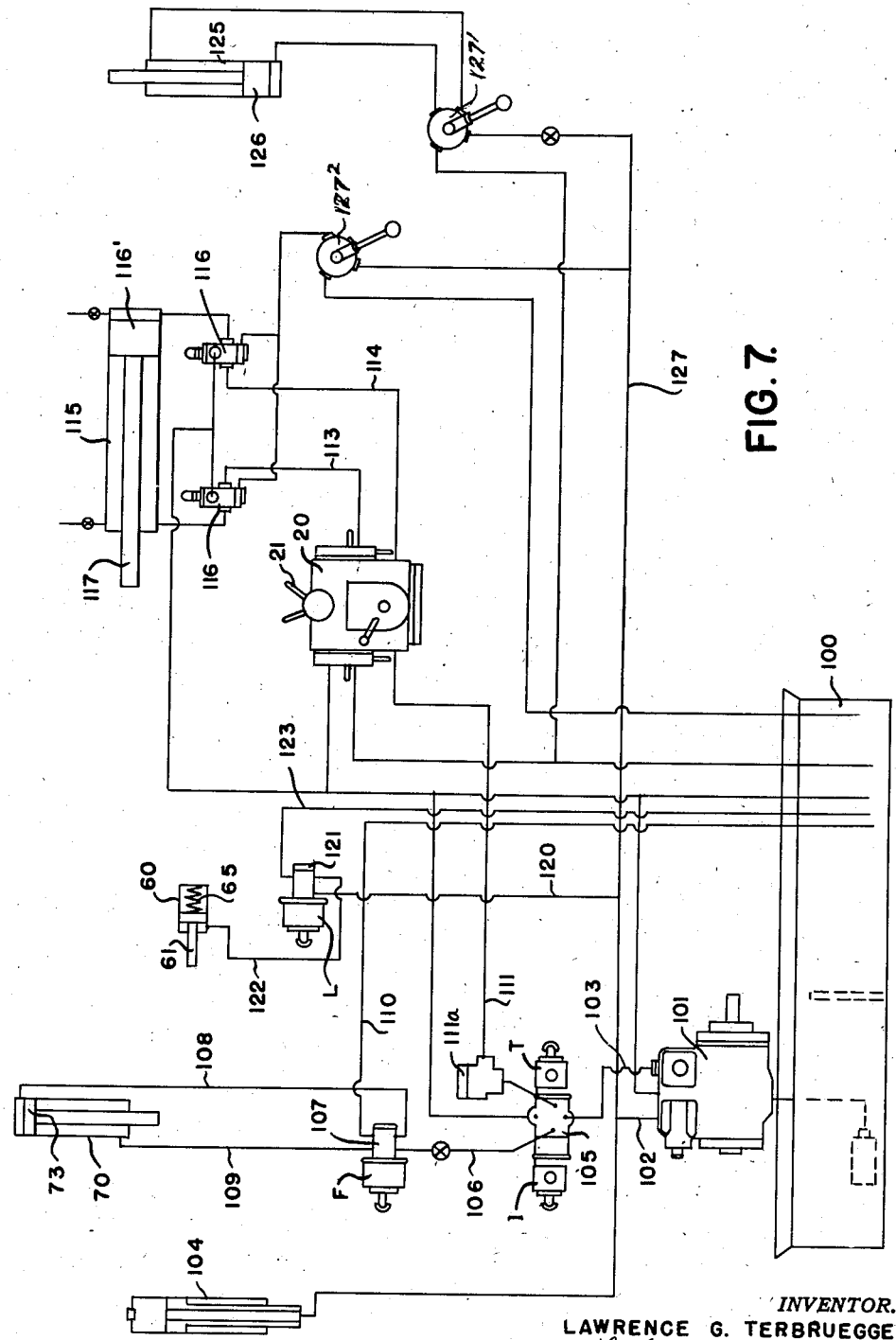

Patented Aug. 11, 1942

2,292,588

UNITED STATES PATENT OFFICE 2,292,588

AUTOMATIC INDEXING CONTROL

Lawrence G. Terbrueggen, Detroit, Mich., assignor to National Broach & Machine Company, Detroit, Mich., a corporation of Michigan Application July 14, 1941, Serial No. 402,409

5 Claims. (Cl. 51—216)

The present invention relates to an automatic machine tool including automatic indexing means. Briefly described, the present invention is embodied in a machine tool having a reciprocable table which carries a rotatable spindle. For purposes of illustration I have shown the invention as embodied in a gear grinding machine and the rotatable spindle referred to, which is carried by the reciprocable table, is the work spindle, and is adapted to carry a work gear to be ground. In this type of machine it is necessary to index the work spindle after one reciprocation. To accomplish this in an efficient manner and to positively insure against indexing during reciprocation, or reciprocation prior to completion of the indexing step, I have provided a novel interlock between the indexing and reciprocating means. Table reciprocation is provided by a hydraulic piston and cylinder, and I employ the same source of power which actuates the table reciprocating piston and cylinder for accomplishing the indexing operation. A valve is provided in the hydraulic system which directs the hydraulic fluid either to the reciprocating means or to the indexing means, but never to both simultaneously. Preferably, control means are provided which prevent initiation of reciprocation unless the index locking pin is firmly seated in the index plate.

With the foregoing general description in mind, it is an object of the present invention to provide novel indexing apparatus.

It is a further object of the invention to provide hydraulically actuated indexing means adapted to release the locking pin from the index plate, to rotate the index plate, and to thereafter restore the locking pin into operative engagement with the index plate.

It is a further object of the invention to provide a machine tool having a reciprocable table and a rotatable spindle, with a single source of power for effecting both table reciprocation and indexing of the spindle, in combination with means for insuring against simultaneous reciprocation of both of said means.

Other objects of the invention will be apparent as the description proceeds and when taken in conjunction with the accompanying drawings, wherein:

Figure 2 is a vertical section through the spindle headstock;

Figure 5 is an end elevation, partly in section, of the spindle headstock, looking to the left in Figure 2;

Figure 7 is a hydraulic diagram showing the connections employed;

Figure 9 is a detail view, partly in section, of a modified construction.

While I have illustrated the invention as embodied in a gear grinding machine, it will readily be appreciated that the invention may be applied to a wide variety of machine tools, and, accordingly, the disclosure of the gear grinding machine is for convenience in making a full disclosure of the present invention.

The present invention includes structural details, a hydraulic circuit, and wiring diagram, which for convenience will be described separately.

Mechanical construction

Figure 1:
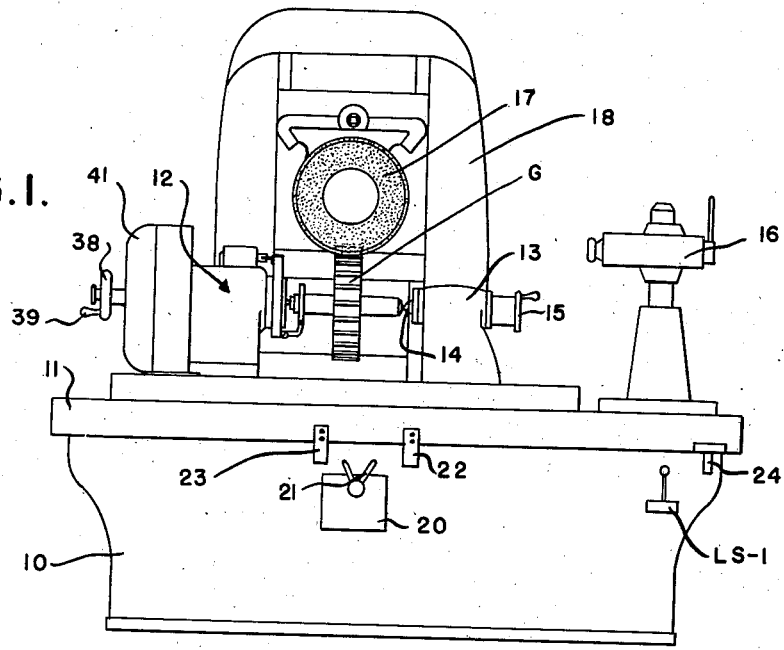
Figure 1 is an elevation of a gear grinding machine in which my present invention is incorporated.

Referring first to Figures 1 to 6, I have illustrated the mechanical construction employed. In Figure 1 I have shown a gear grinding machine as comprising a base 10, upon which is mounted a reciprocable table 11 which carries a headstock 12 and a tailstock 13. The headstock 12 contains the indexing mechanism, best shown in Figures 2 to 5, and will be subsequently described in detail. The tailstock 13 includes a center 14, which may be advanced by means of a handwheel 15 through suitable conventional mechanism (not shown). Trimming mechanism is indicated generally at 16, which cooperates with a grinding wheel 17. The grinding wheel 17 is mounted on a column 18 carried by the base 10.

This type of gear grinding machine is well known, and in operation the grinding wheel 17 is first trimmed so that its periphery has a contour or contours corresponding to the tooth surfaces of a work gear G. The work gear G is indexed so that a tooth space is in alignment with the grinding wheel 17, and the carriage 11 is then reciprocated to cause the tooth space of the gear G to be traversed from end to end by the grinding wheel 17, thus grinding the tooth surface of the gear to the desired profile.

In the present machine reciprocation of the table is carried out by a hydraulic cylinder and piston, suitably interconnecting the base 10 and table 11. Fluid under pressure is supplied to the piston, and the direction of action of the fluid on the piston is controlled by a mechanical reversing valve 20 having a lever 21 adapted to be engaged by dogs 22 or 23, so as to limit table reciprocation and to reverse table reciprocation so long as fluid under pressure is supplied to the reversing valve. In addition, the base 10 carries a limit switch LS1 whose function will later be described. The table 11 carries an actuating dog 24 which is adapted to engage the limit switch LS1 and to trip the same when the table 11 is in its extreme left-hand or inoperative position. It is in this position that indexing takes place, as will later be described.

Referring now to Figures 2 to 5, I have shown the headstock 12 as comprising a spindle housing casting 30 having at its bottom ways 31 which are adjustable along longitudinally extending ways formed in table 11 of the machine. A spindle 32 is mounted for rotation in the spindle housing 30, suitable bearings being indicated at 33 and 34. The spindle 32 is hollow, and has a center 35 positioned in one end thereof for locating a work piece. A drive plate 36 is secured to the end of the spindle 32 and carries a driving dog 37 which is adapted to be connected to the work piece, or a work piece supporting fixture to insure proper indexing of the work piece upon the corresponding indexing of the spindle 32. A handwheel 38 having an operating handle 39, is keyed as indicated at 40 to the spindle 32.

The spindle housing 30, at the left-hand end as seen in Figure 2, is open and is adapted to be normally closed by a removable closure plate 41. The indexing means are received within the space 42 defined by the closure plate 41 in the open end of the spindle housing.

Figure 3:
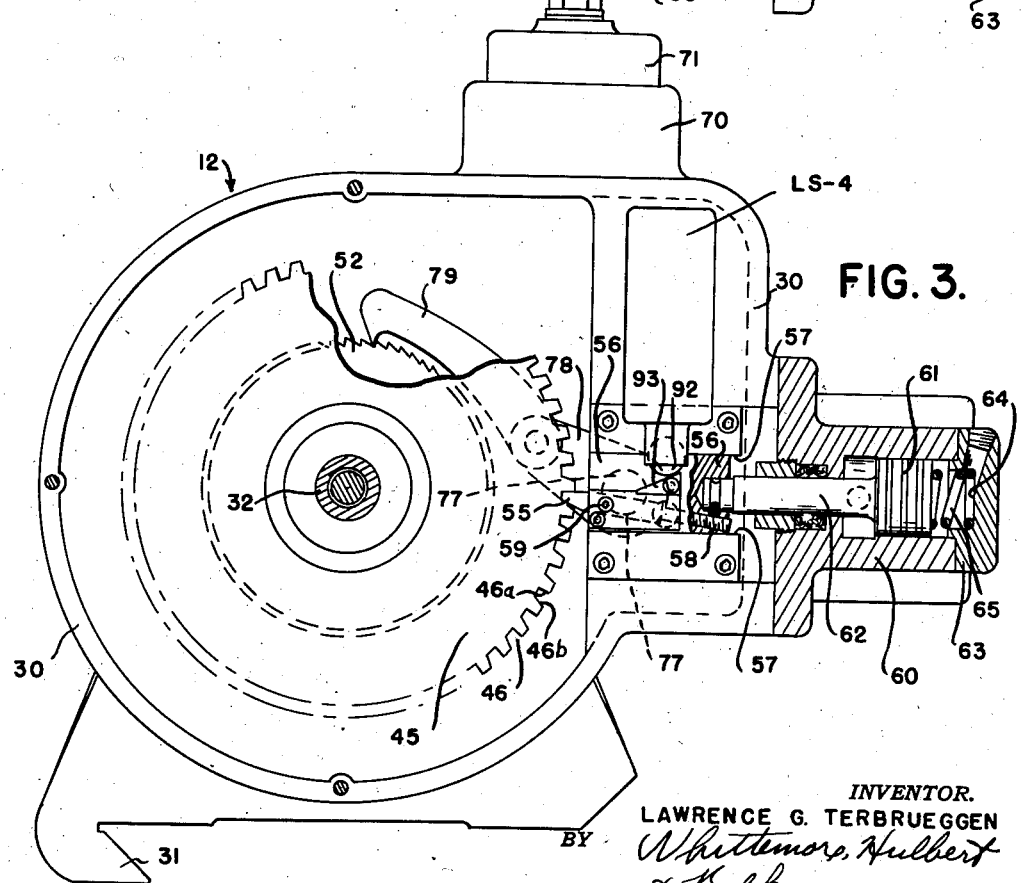
Figure 3 is a section on the line 3—3, Figure 2.

The indexing means comprises an index disc 45 having a plurality of notches 46 formed in its periphery. The notches 46 have one side 46a which is radial of the disc, and one side 46b which is inclined relative to the side 46a, as shown in Figure 3. The index disc 45 is rigidly mounted on a hub member 50 which is keyed or otherwise secured to the spindle 32, as indicated at 51. The hub 50 also carries a ratchet disc 52 which is rigidly secured thereon against rotation.

Referring now more particularly to Figure 3, I show a locator pin 55 carried by a plate 56 which is mounted in ways 57 provided in the spindle housing. The pin 55 has surfaces shaped to correspond to the sides 46a and 46b of the notches in the index plate 45. As best seen in Figure 3, the pin 55 is mounted in a slot in the plate 56 which is inclined to a radial line with respect to the index disc, and an adjusting screw 58 is provided for effecting adjustment of the locator pin 55 in the slot. The locator pin after adjustment by the screw 58 is locked in adjusted position by a set screw indicated at 59. As a result of the construction just described, the pin 55 when its locking surfaces are worn, may be adjusted forwardly and finished so as to insure accuracy throughout its life.

As seen in Figure 5, the index disc 45 has associated therewith a frictional brake shoe 66 urged into frictional engagement therewith by means of a compression spring 67, whose tension may be varied by an adjustable seat 68. This prevents rotation of the index disc and associated parts, except as positively moved by the pawl 79, and prevents overrunning, which might otherwise occur.

A hydraulic cylinder 60 is mounted on the spindle housing, and has therein a piston 61 connected by means of a piston rod 62 to the plate 56. The cylinder 60 is closed by a plug 63 having a recess 64 therein forming a seat for a compression spring 65. Compression spring 65 bears against the top of the piston 61 and urges the slide 56 toward engagement with the index plate 45.

In Figure 9 I have shown an alternative connection between the piston 61 and the plate 56 which carries the locator pin 55. In this figure the cylinder and piston is omitted. The piston rod 62 is shown as provided with a cup 62a at its free end. The plate 56 which carries the locator pin 55 has connected thereto a rod 56a having an enlarged head seated within the cup 62a. As shown in the figure, the cup 62a is closed by a nut 62b which provides a seat inside the cup 62a against which the head of the rod 56a may engage. Between the plate 56 and the nut 62b is a compression spring 69, urging the plate 56 to the left, as seen in Figure 9, into engagement with the index disc indicated at 45. The piston rod 62 is connected to a piston, such as shown at 61 in Figure 3, which is, in this case, adapted to be moved in both directions by hydraulic fluid, and whose motion in both directions is limited by positive stops. The parts are so adjusted that when hydraulic pressure is admitted to the cylinder to move the piston rod 62 to the left, the locator pin 55 seats fully into a recess in the index disc 45, and thereafter movement of the piston rod 62 to the left introduces clearance between the head of the rod 56a and the seat provided by the nut 62b. As a result of this, the pressure which is applied to the index disc 45 by the locator pin 55 is only that supplied by the compression spring 69, and this will be substantially uniform. It will be observed that with the construction illustrated in Figure 3, the compression spring 69 has to move the entire piston 61, and has to move the piston rod 62 through packings provided therefor. The amount of friction provided by packings varies considerably, so that it was found that much more uniform results can be obtained by the construction illustrated in Figure 9. At the same time it will be appreciated that it will be undesirable to provide a positive hydraulic movement of the locator pin into its recess, for the reason that the hydraulic pressure would be of sufficient rate to cause a slight distortion of the structure associated with the index plate 45.

The spindle housing 30 carries a second hydraulic cylinder 70, having a closure 71 provided with an adjustable abutment 72 which extends into the interior of the cylinder and provides an adjustable stop for limiting movement of a piston 73 received within the cylinder 70. The piston 73 has a rack portion 75 which meshes with a pinion 76, best seen in Figure 4. The pinion 76 is integrally formed with, or keyed to a shaft 77, to which is keyed a lever 78. Adjacent the free end of the lever 78 is pivoted a pawl 79 adapted to have one-way engagement with the ratchet teeth of the ratchet disc 52. The pawl 79 is biased into engagement with the ratchet disc 52 by means of a coil spring 80. It will be apparent that upon reciprocation of the piston 73 in the cylinder 70, intermittent step by step rotation will be imparted to the ratchet disc, and hence to the spindle 32. Proper actuation of the locator pin 55 will accurately position the spindle after each rotation thereof.

As best seen in Figure 5, I provide on the spindle housing 30 a pair of limit switches LS2 and LS3 having actuating rollers 81 and 82 respectively. Mounted on the projecting end of the shaft 77 are a pair of actuating members 83 and 84 respectively. The camming member 83 engages the limit switch LS2 in normal position and moves away from the same during the indexing motion of the shaft 77. The camming member 84 is adapted to move into engagement with the roller 82 so as to actuate the limit switch LS3 upon extreme movement of the piston 73 and shaft 77 during the indexing rotation of the spindle 32.

Mounted on the spindle housing 30 is a limit switch LS5 having an actuating roller 90 adapted to be engaged by an actuating member 91 carried by the drive plate 36. As will be apparent, limit switch LS5 will be actuated only once during a complete rotation of the spindle 32. The parts are so arranged that limit switch LS5 will be tripped upon movement of the spindle 32 from next to last to the last index position.

The fourth limit switch LS4 is carried by the spindle housing 30, and has an actuating roller 92 adapted to be engaged by an actuating member 93 carried by the plate 56 which carries the locator pin 55. Limit switch LS2 is a two-position switch, as will later appear, and is moved to one position when the index rack 75 starts an indexing movement, and is moved back to initial position when the index rack 75 returns to initial position. Limit switch LS3 is normally closed and is opened only when the index rack 75 moves to extreme position (downwardly as seen in Figure 5). Limit switch LS4 is normally closed, and is opened upon the first slight movement of the plate 56 in a direction to withdraw the locator pin 55 from a recess in the index plate 45. Limit switch LS4 remains open until the locator pin 55 is fully seated in the next recess of the index disc 45. Limit switch LS5 is normally closed, and is momentarily opened during the last indexing movement.

Figure 6:
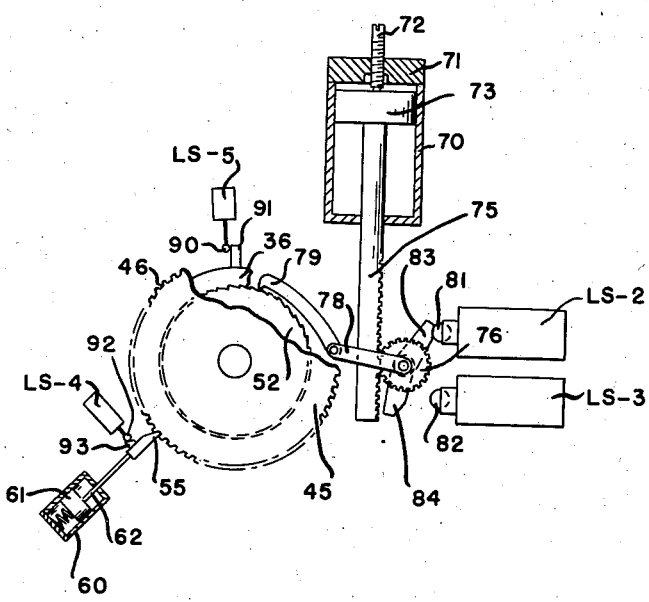
Figure 6 is a diagrammatic view showing the relationship of the limit switches to the movable parts of the indexing mechanism.
Figure 4:
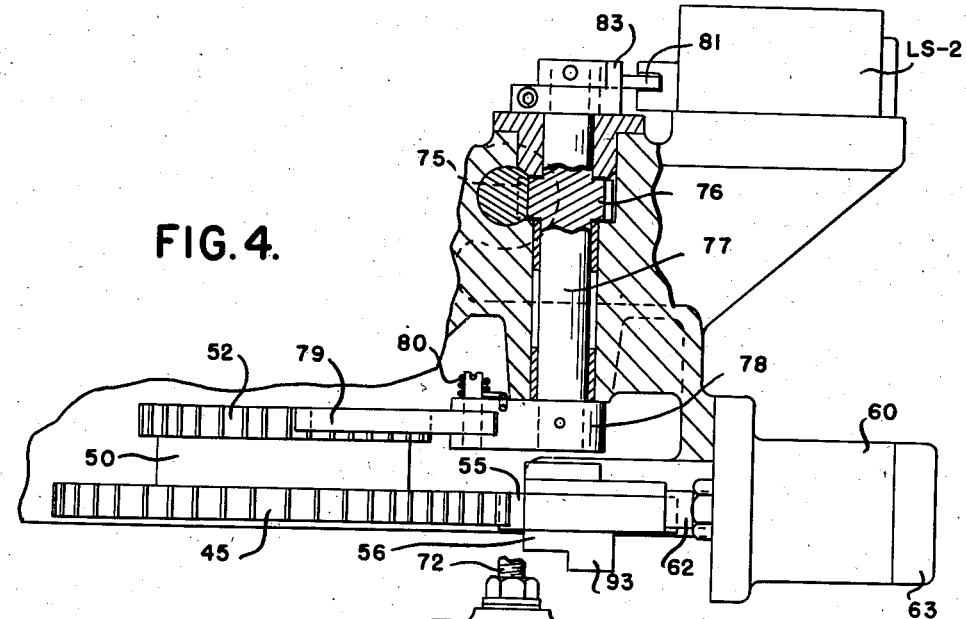
Figure 4 is a top plan view of the spindle headstock, with parts broken away.

I have illustrated the relationship of limit switches and movable parts of the indexing mechanism in Figure 6, in which the parts have been given the same reference numerals as applied to the other figures in the drawings. It will be understood that Figure 6 is merely diagrammatic, and is presented to clarify the disclosure.

Hydraulic circuit

Referring now to Figure 7, I have shown a tank 100 containing hydraulic fluid. A pump 101 is provided which is continuously driven by a motor (not shown). The pump 101 is a double pump and provides hydraulic fluid in two different quantities from lines 102 and 103. The fluid line 102 connects to a holding cylinder 104 which is connected to balance the slide which supports the grinding wheel spindle, and forms no part of the present invention.

The fluid line 103 connects to a valve 105 having an outlet connection 106 which leads to the index forward and reverse valve 107. From the valve 107 pressure lines 108 and 109 lead to the index cylinder 70 previously referred to. The index forward and reverse valve 107 is controlled by an index forward solenoid F. A return line 110 leads to the tank. A second outlet line 111 interconnects the valve 105 and a mechanically operated reversing valve 20 previously described. The line 111 includes a check valve 111a. In Figure 7 the valve 20 is shown as having the automatically operated lever 21 adapted to be engaged by the dogs 22 or 23 previously described. From the valve 20, outlet lines 113 and 114 lead to opposite ends of a table feed cylinder 115 through unloading valves 116. The table feed cylinder 115 has therein a piston 116' and a piston rod 117. The piston and cylinder interconnect the base 10 and the table 11, as will be readily understood, so that upon relative movement between the piston and cylinder, traverse of table 11 will be effected in a direction controlled by the lever 21 of the valve 20.

The arrangement is such that the valve 105 may supply fluid under pressure either to the line 106 or to the line 111 but it cannot under any circumstances supply fluid under pressure to both simultaneously.

The outlet line 102 has a branch 120 connecting to a valve 121 controlled by the index lock solenoid L. An outlet line 122 from the valve L connects to the index lock cylinder 60 and urges the same to disengaged position against the compression spring 65 previously referred to. When pressure is released from the line 122 the piston 61 is urged to the left as seen in Figure 7 by means of compression spring referred to. The valve 121 has an outlet connection 123 to the tank.

I have also shown a wheel dressing cylinder 125 having a piston 126 therein, which forms no part of the present invention but which is shown as connected through the manually operable valve 127' to the pressure line 102 by means of a connection 127. I have also shown the unloading valve 116 as connected through the manually operable valve 127² to the pressure line 102 by means of the connection 127.

The operation of the mechanism so far as the hydraulic system is concerned is as follows: Assume that an indexing operation has just been completed. Pressure from the line 103 is directed by the valve 105 to the line 111 and is directed by the reversing valve 20 to the appropriate side of the traverse cylinder 115. This pressure causes the table to travel (to the right as seen in Figure 1) until the dog 23 trips the operating lever of the valve 20. This merely reverses the fluid passing through the valve 20 to the other side of the cylinder 115 and causes traverse of the table 11 to the left as seen in Figure 6. When the table reaches its extreme left-hand position the valve 105 is reversed so that fluid under pressure is cut off from the line 111 and is supplied through the line 106 to the index forward valve 107. At the same time fluid under pressure is admitted through valve 121 to the line 122, thereby moving the piston 61 to the right in Figure 7 and withdrawing the locator pin 55 from the recess 46 in the index plate 45. This frees the spindle 32 for rotation and the pressure admitted through the line 108 to the index cylinder 70 rotates the spindle a predetermined amount. When the piston 73 of the index spindle 70 reaches its extreme downward position, as seen in Figure 7, valve 107 is reversed and fluid is admitted to the opposite side of the piston 73, thus moving pawl 79 back to a new position. The valve 121 is reversed so that pressure is cut off from the line 122 leading to the index lock cylinder 60 with the result that the piston 61 therein is moved to the left (as seen in Figure 7) to cause the locator pin 55 to engage in a recess in the index plate. As soon as the pin 55 is in fully engaged position the valve 105 is again reversed, thus supplying pressure to the valve 20 and initiating a second traverse of the table 11.

Electrical circuits

Figure 8:
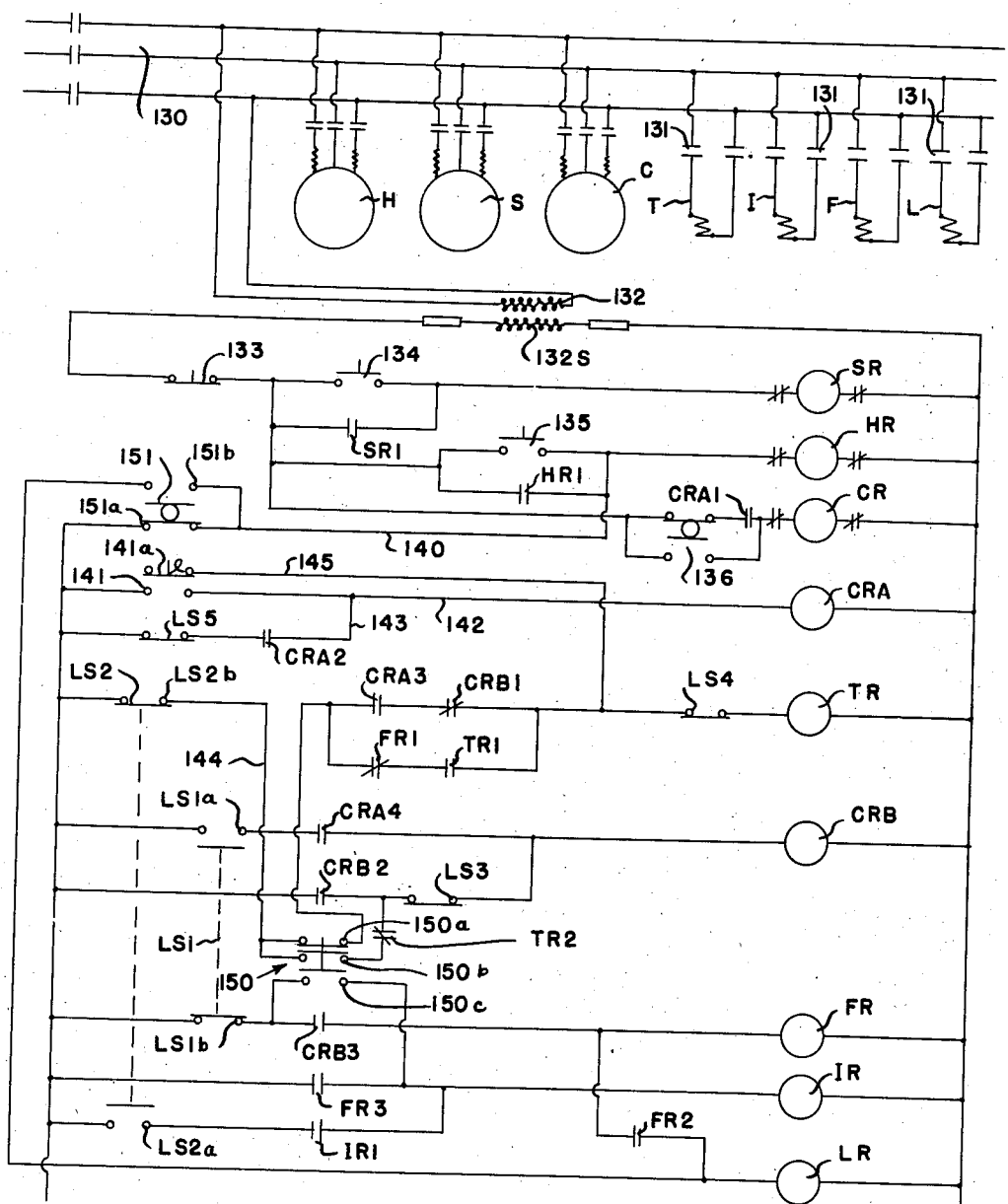
Figure 8 is a wiring diagram showing the connection between the various limit switches, solenoids, etc.

Actuation of the various valves referred to in the preceding disclosure of the hydraulic circuit is accomplished by means of solenoids included in the electrical circuits. For a description of the electrical circuits, reference is now made to Figure 8. In Figure 8 the various switches are shown in the position which they occupy at the time of completion of indexing operation and just prior to initiation of traverse of the table 11. With this understanding, the circuit will be described in conjunction with its operation. In this figure I have shown a three-wire system 130 to which are connected three motors: A hydraulic motor H which operates the pump 101, a spindle motor S which operates the grinding wheel spindle, and a coolant motor C which operates a pump for supplying coolant to the working zone. In addition, connected across two wires of the three-wire system 130 I provide the four solenoids T, I, F and L previously described. These solenoids are mechanically connected to the valves 105, 105, 107 and 121 respectively, and are adapted to be actuated by corresponding relays later to be described. Each of the solenoids T, I, F and L is provided with normally open switches indicated at 131 which will be closed when the corresponding relays, later to be described, are energized. In the figure, normally open contacts are indicated by parallel vertical lines and normally closed contacts are indicated by parallel vertical lines crossed with a diagonal line.

At 132 I have indicated a transformer adapted to supply current to the relay system at a lower voltage. A secondary of the transformer, 132s, is connected through a master stop switch 133 and a spindle start switch 134 to spindle relay SR, which actuates a contactor controlling the spindle motor S. Energization of the spindle relay SR also closes normally open contacts SR1 and provides a holding circuit for the spindle motor independent of the spindle start switch 134.

The hydraulic start switch 135, when actuated, energizes the hydraulic relays HR. The hydraulic relays HR when energized closes the circuits to the hydraulic motor H and also closes normally open contact HR1 to establish a holding circuit for the hydraulic motor independent of the hydraulic start switch 135.

The coolant motor C is controlled by a coolant relay CR which may be controlled automatically or manually as desired. For this purpose I provide a three position switch 136, which when in upper position (as shown in Figure 8), is adapted to provide for automatic control of the coolant motor C by reason of the normally open contact CRA1 which is controlled by a relay CRA. In the lower position the circuit is completed around normally open contacts CRA1, thus providing for continuous operation of the coolant motor so long as the master stop switch 133 remains closed. In intermediate position the current to the coolant CR is interrupted and the coolant motor C will not operate.

A line connection 140 leads from the controlled side of the hydraulic start switch 135 to a cycle start switch 141 which is adapted to supply current through line 142 to a relay CRA. Relay CRA when energized actuates a contactor, closing normally open contacts CRA1, previously described, and CRA2 in series with limit switch LS5 in a holding circuit 143. As will be apparent, when once actuated, relay CRA remains energized through the holding circuit until limit switch LS5 is opened which, as previously described, occurs only during the last indexing operation, which completes a rotation of the spindle 32. Relay CRA also closes normally open contacts CRA3 and CRA4. Closure of normally open contact CRA3 completes a circuit through line 144 to the traverse relay TR, this circuit being completed at this time, and also through normally closed contacts CRB1. Contacts CRB1 are controlled by relay CRB, whose purpose will later appear. Bar 141a of switch 141 is connected by a pigtail to line 145, and completes a parallel circuit to relay TR momentarily, provided limit switch LS4 is closed.

Energization of traverse relay TR closes contact 131 to the traverse solenoid T and admits fluid to the reversing valve 20, thus starting traverse of the table. At the same time energization of the traverse relay TR closes normally open contacts TR1 and completes a holding circuit around contacts CRA3 and CRB1 through normally closed contacts FR1. It will be observed that both the energizing and holding circuits for relay TR include contacts 150a of manual index switch 150, so that neither circuit can be completed when switch 150 is depressed.

The first movement of the table 11 to the right, as seen in Figure 1, shifts limit switch LS1 to its other position or upwardly, as seen in the diagram of Figure 8. Movement of limit switch LS1 upwardly closes contacts LS1a and completes a circuit to relay CRB through the contacts CRA4 which are normally open but which remain closed through the cycle by reason of energization of relay CRA, as previously described. Energization of relay CRB opens normally closed contact CRB1, but this has no immediate effect since a holding circuit to the traverse relay TR has been established through contacts FR1 and TR1. It also closes normally open contacts CRB2, thus completing a holding circuit to the relay CRB through the limit switch LS3. Normally open contacts CRB3 are also closed by reason of energization of the relay CRB.

The table 11 continues to travel to the right until the dog 23 trips reverse valve 20, after which the table reverses and traverses back to initial position, and the dog 24 then trips limit switch LS1, moving the same downwardly to the position shown in Figure 8. Downward movement of the limit switch LS1 to the position shown in Figure 8 now has the effect of completing a circuit through the contacts CRB3 to forward relay FR which, in turn, closes the contacts to the forward solenoid F, thus setting the valve 107 so as to direct fluid to the proper side of the index piston 73 to cause indexing rotation of the mechanism. At the same time index forward relay FR closes normally open contacts FR2, thus completing a circuit to the locator relay LR. Energization of the locator relay LR closes contacts 131 on the locator solenoid L and withdraws the locator pin 55 from the index plate. At the same time contacts FR3 close, thus completing a circuit to index relay IR. This has the effect of closing contacts 131 to the index solenoid I which directs fluid from the valve 105 through the line 106 to the valve 107. At the same time energization of the forward relay FR opens normally closed contact FR1. Since normally closed contacts CRB1 are now open by reason of energization of relay CRB, opening of normally closed contacts FR1 breaks the circuit to the traverse relay which, in turn, deenergizes the traverse solenoid.

Under the influence of the hydraulic fluid admitted to the index cylinder 70, the piston 73 moves in a direction to rotate the ratchet disc 52. The first movement of the pinion shaft 77 (Figures 4 and 5) moves limit switch LS2 from its normal position, as shown in Figure 8, downwardly. This has the effect of closing contacts LS2a and opening contacts LS2b. Closure of contacts LS2a completes a holding circuit through normally open (but now closed) contacts IR1 and establishes a holding circuit for the index relay IR independent of contacts FR3. The piston 73 continues to move in its indexing movement until limit switch LS3 is opened momentarily. This breaks the holding circuit to the relay CRB, which has the effect of closing normally closed contacts CRB1 and opening normally open contacts CRB2 and CRB3. Opening of contacts CRB3 deenergizes the index forward relay FR which deenergizes index forward solenoid F. This reverses the direction of application of fluid pressure in the index cylinder 70 and restores the pawl 79 to a new position.

At the same time, deenergization of the index forward relay FR deenergizes the locator relay LR by reason of opening of contacts FR2. This permits the locator pin 55 to move forward under the influence of the compression spring 65 so as to seat in another recess 46 in the index plate 45. Return movement of the index piston 73 to its initial position again trips limit switch LS2, moving it upwardly to the position shown in Figure 8. This opens the holding circuit to index relay IR and deenergizes the index solenoid I, cutting off the flow of fluid from valve 105 through line 106 to valve 107. Upward movement of the limit switch LS2 establishes a portion of the circuit to the traverse relay TR through contacts CRA3 and CRB1, limit switch LS4 remaining open at this time. As soon as the locator pin 55 is fully seated in the next notch of the index disc, limit switch LS4 is closed, thus establishing a circuit to the traverse relay and thus initiating a second traverse of the machine.

This completes a single indexing cycle. As will be apparent, this cycle is repeated automatically until the work spindle has been indexed completely around. Upon the next to the last indexing rotation, limit switch LS5 is opened momentarily, thus opening the holding circuit to the relay CRA, deenergizing the same. The cycle is completed and the machine stops at completion of the next return stroke of the table 11 without further indexing, since at this time contacts CRA4 will be opened.

A manually operated index switch 150 is provided which permits indexing at any time without complete cycling of the machine. The index piston 73 will move forward and back and stop if the index switch 150 is momentarily actuated. Switch 150 has three sets of contacts 150a, 150b, and 150c. Contacts 150a are in series with contacts LS2a, and limit switch LS4, and this circuit is broken when switch 150 is depressed manually to operate the indexing mechanism.

Depressing switch 150 closes contacts 150b, completing a circuit to relay CRB; and closes contacts 150c, completing a circuit to relay IR. Energization of relay CRB closes contacts CRB3, energizing index forward relay FR, and locator relay LR, as previously described, and starts an indexing cycle. Normally closed contacts TR2 are in the line between contacts 150b, and relay CRB, so that the indexing cycle can be initiated only if relay TR is deenergized.

A locator control switch 151 is provided which may be closed to energize the locator relay LR and hence the locator solenoid L. The locator control switch 151 in its inoperative position completes a circuit through contacts 151a which supply the current to all of the controls on automatic cycling. When the control switch 151 is in upper position to complete a circuit between contacts 151b, it follows that automatic cycling cannot take place. Immediately upon returning the locator control switch to open position and closing the cycle start switch 141, the locator pin 55 goes back into position and the circuit is reestablished for further automatic operation.

If during any part of the operation cycle, or from a standstill, it is desired to dress the wheel by energizing the table so that the trimmer 16 is adjacent the grinding wheel 17, the operator must lift the dog 24 out of operating position so that it will not engage limit switch LS1 and must also lift the dog 22 out of position so that it will not mechanically reverse the valve 20. The reason for lifting dog 24 out of position is to prevent indexing of the work before wheel dressing.

After the wheel has been dressed and the traverse table has been started from left to right, as shown in Figure 1, by manual operation of the valve 20, traverse will start to the right and stop at the starting position actuating limit switch LS1. Limit switch LS1 will cause traverse of the table to stop and will index the work to the next station. After the indexing, the machine will continue its normal cycle.

The specification and drawings have disclosed in considerable detail the structure and circuits of my improved machine tool, but it will be appreciated that this has been done merely to enable those skilled in the art to practice the present invention, the scope of which is indicated in the appended claims.

What I claim as my invention is:

1. In a machine tool having a reciprocable table and a rotary spindle, power means for traversing said table, power means for indexing said spindle between traverses of said table, and control means for said traversing means which positively prevent traverse of said table except when the spindle is in properly indexed position, said indexing means including a peripherally notched index plate, and an index pin engageable in said recesses, said control means including a member moved to traverse-interrupting position upon slight movement of said pin out of a recess and moved to traverse-permitting position only upon movement of said pin fully into a recess of said index plate.

2. In automatic indexing means, a notched index disc, a locator pin movable into and out of notches in said disc, a hydraulic cylinder, a piston in said cylinder, means providing for limited sliding movement between said piston and locator pin, and a compression spring acting to urge said locator pin toward said index disc, whereby said pin is withdrawn hydraulically, but is seated solely by spring pressure.

3. In automatic indexing means, a notched index disc, a locator pin movable into and out of notches in said disc, a hydraulic cylinder, a piston in said cylinder, stop means for said piston, a piston rod connected to said piston, a cup at the end of said piston rod, a rod connected to said locator pin having a head slidably received in said cup, an apertured closure for said cup through which said rod is slidable, and a compression spring in said cup urging said rod outwardly thereof.

4. An indexing device comprising an index disc having notches, the side walls of said notches being inwardly tapered, one of said side walls being radial of said disc, a support slidably mounted for movement radial of said disc, a locator pin on said support having locator surfaces corresponding to the side walls of said notches, said locator pin being mounted for adjustment forwardly on said support in a direction across the radial line determined by the radial side wall of a notch engaged by said pin to compensate for wear on the surface of said pin which engages the radial side walls of said notches.

5. In a machine tool having a reciprocable table and a rotary spindle, power means for traversing said table, power means for indexing said spindle between traverses of said table, said last mentioned means comprising an index plate and a cooperating index member movable into engagement with and away from said plate and control means for said traversing means to positively prevent traverse of said table except when the spindle is in properly indexed position, said control means comprising a member movable to traverse-interrupting position upon movement of said index member away from said index plate and movable to traverse-permitting position only upon movement of said index member fully into engagement with said index plate.

LAWRENCE G. TERBRUEGGEN.